United States Patent
Tomizawa et al.

(10) Patent No.: US 10,900,530 B2
(45) Date of Patent: Jan. 26, 2021

(54) EXPANSION VALVE

(71) Applicant: FUJIKOKI CORPORATION, Tokyo (JP)

(72) Inventors: Naoki Tomizawa, Tokyo (JP); Hiroshi Yokota, Tokyo (JP); Shogo Yamazaki, Tokyo (JP)

(73) Assignee: FUJIKOKI CORPORATION, Tokyo (JP)

(*) Notice: Subject to any disclaimer, the term of this patent is extended or adjusted under 35 U.S.C. 154(b) by 13 days.

(21) Appl. No.: 16/018,120

(22) Filed: Jun. 26, 2018

(65) Prior Publication Data
US 2019/0003546 A1 Jan. 3, 2019

(30) Foreign Application Priority Data

Jun. 29, 2017 (JP) .................................. 2017-127088

(51) Int. Cl.
F16F 1/02 (2006.01)
F25B 41/06 (2006.01)
F25B 41/04 (2006.01)

(52) U.S. Cl.
CPC ............ *F16F 1/025* (2013.01); *F25B 41/043* (2013.01); *F25B 41/062* (2013.01); *F25B 2341/06* (2013.01); *F25B 2341/0683* (2013.01); *F25B 2500/12* (2013.01); *F25B 2500/13* (2013.01)

(58) Field of Classification Search
CPC .. F25B 41/062; F25B 41/043; F25B 2341/06; F16K 1/025
See application file for complete search history.

(56) References Cited

U.S. PATENT DOCUMENTS

| 2004/0177632 | A1* | 9/2004 | Watari | F25B 41/062 62/222 |
|---|---|---|---|---|
| 2016/0097574 | A1* | 4/2016 | Kaneko | F25B 41/062 62/225 |

FOREIGN PATENT DOCUMENTS

| EP | 1 457 747 A2 | 9/2004 |
|---|---|---|
| EP | 3 002 531 A1 | 4/2016 |
| JP | 2005-156046 A | 6/2005 |
| JP | 2014-149128 A | 8/2014 |

(Continued)

OTHER PUBLICATIONS

Watari et al, Thermal Expansion Valve, Dec. 27, 2016, JP6053543B2, Whole Document (Year: 2016).*

(Continued)

*Primary Examiner* — Elizabeth J Martin
*Assistant Examiner* — Nael N Babaa
(74) *Attorney, Agent, or Firm* — Bacon & Thomas, PLLC

(57) ABSTRACT

An expansion valve includes a valve main body having a valve chamber therein, a valve body arranged within the valve chamber, a valve body support member supporting the valve body, an urging member urging the valve body toward a valve seat, an actuating bar pressing the valve body in an opening direction of the valve against urging force generated by the urging member, and a vibration proof spring suppressing vibration of the valve body or the actuating bar. The actuating bar has an outer peripheral surface of which a part constitutes a contact surface slidably contacting with the vibration proof spring, and the contact surface has a shape by which the amount of deformation of the vibration proof spring becomes greater as the valve body goes towards a closing direction of the valve.

4 Claims, 4 Drawing Sheets

(56) References Cited

FOREIGN PATENT DOCUMENTS

JP            6053543 B2 * 12/2016
JP            6053543 B2    12/2016

OTHER PUBLICATIONS

European Search Report in corresponding European Application No. 18180261.2, dated Oct. 31, 2018.

* cited by examiner

EXPANSION VALVE

BACKGROUND OF THE INVENTION

1. Field of the Invention

The present invention relates to an expansion valve, and more particularly to an expansion valve with a vibration proofing spring. The present invention further relates to a refrigerant circulation system using the expansion valve.

2. Description of Related Art

There has been known a phenomenon that a valve body and an actuating bar pressing the valve body vibrate due to a differential pressure between a pressure on the upstream side of the valve body and a pressure on the downstream side of the valve body in the expansion valve, and an abnormal noise is produced. In order to suppress the vibration, a vibration proof spring has been sometimes arranged within a valve main body of the expansion valve.

As a relevant technique, a thermostatic expansion valve is disclosed in Japanese Patent No. 6053543 (hereinafter "patent literature 1"). The thermostatic expansion valve disclosed in the patent literature 1 is provided with a vibration proof member which is fit into an outer periphery of the actuating bar and prevents a vibration of the actuating bar. The vibration proof member has an annular portion which is formed by elastically deforming an elongated plate-like elastic material into an annular shape, and three vibration proof springs which are formed by making a cut in a part of the elastic material and inwardly folding the part. Further, the vibration proof springs are respectively arranged at positions at which a circumference is equally divided into three parts, and spring force of one vibration proof spring among them is set to be greater than those of the other vibration proof springs.

Further, Japanese Unexamined Laid-Open Patent Publication No. 2005-156046 (hereinafter "the patent literature 2") discloses an expansion valve in the expansion valve disclosed in the patent literature 2, a vibration proof spring is arranged between a support member supporting a valve body and a coil spring.

In the thermostatic expansion valve disclosed in the patent literature 1 and the expansion valve disclosed in the patent literature 2, the spring force of the vibration proof spring is fixed regardless of how much an opening degree of the expansion valve is. In the meantime, the differential pressure between the pressure on the upstream side of the valve body and the pressure on the downstream side of the valve body in the expansion valve tends to become greater in a case where the opening degree of the expansion valve is very small, and to increase fluid force applied to the valve. As a result, in the case where the opening degree of the expansion valve is very small, the valve body and the actuating bar is likely to vibrate, and to produce an abnormal noise as a consequence.

SUMMARY

Accordingly, an object of the present invention is to provide an improved expansion valve. Another object of the present invention is to provide an expansion valve that can suppress production of an abnormal noise from an expansion valve, especially in a case where an opening degree of the expansion valve is very small.

In order to achieve at least one of the above objects and/or other objects, an expansion valve according to one exemplary embodiment reflecting one aspect of the present invention includes a valve main body provided with a valve chamber therein, a valve body arranged within the valve chamber, a valve body support member supporting the valve body, an urging member urging the valve body toward a valve seat, an actuating bar being in contact with the valve body and pressing the valve body in an opening direction of the valve against urging force generated by the urging member, and a vibration proof spring suppressing a vibration of the valve body and/or the actuating bar. The actuating bar has an outer peripheral surface of which a part constitutes a contact surface slidably contacting with the vibration proof spring, and the contact surface has a shape by which the amount of deformation of the vibration proof spring becomes greater as the valve body goes towards a closing direction of the valve.

In the expansion valve mentioned above, the vibration proof spring preferably includes a ring spring. The ring spring is preferably provided with a ring portion, and an elastic protruding portion inwardly protruding from the ring portion and contacting with the outer peripheral surface of the actuating bar.

In the expansion valve, the valve main body is preferably provided with a first flow path and a second flow path communicating with the valve chamber, and a return flow path. The vibration proof spring is preferably arranged within a concave portion of the valve main body. Further, the concave portion preferably communicates with the return flow path.

In the above expansion valve, the contact surface preferably has a deformation amount adjustment surface on which a distance from a center axis of the actuating bar as the surface goes towards a valve closing direction.

Further, the expansion valve is preferably provided with a power element driving the actuating bar.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

DESCRIPTION OF PREFERRED EMBODIMENT

Figure 1:
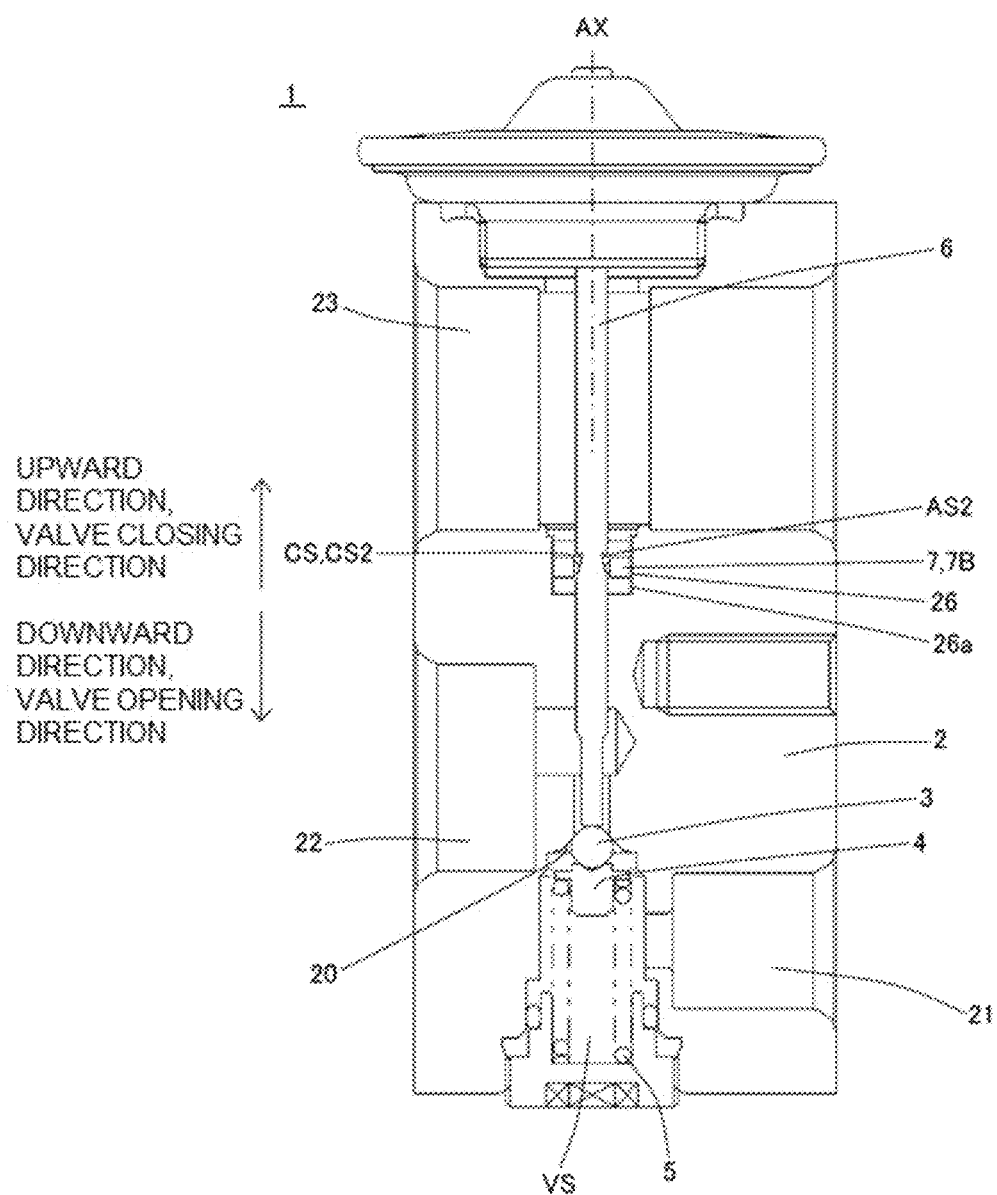
FIG. 1 is a view schematically showing an overall structure of an expansion valve according to an embodiment.

A description will be given below of an expansion valve 1 according to an embodiment with reference to the accompanying drawings. In the following description of the embodiment, the same reference numerals will be given to portions and members having the same function, and a redundant description of the portions and the members having the same reference numerals will not be repeated.
(Definition of Direction)

In the present specification, a direction heading from a valve body 3 to an actuating bar 6 is defined as an "upward direction", and a direction heading from the actuating bar 6 to the valve body 3 is defined as a "downward direction". Therefore, the direction heading from the valve body 3 to the actuating bar 6 is called as an "upward direction" in the present specification, regardless of whatever posture an expansion valve 1 takes.

Embodiment

Figure 2:
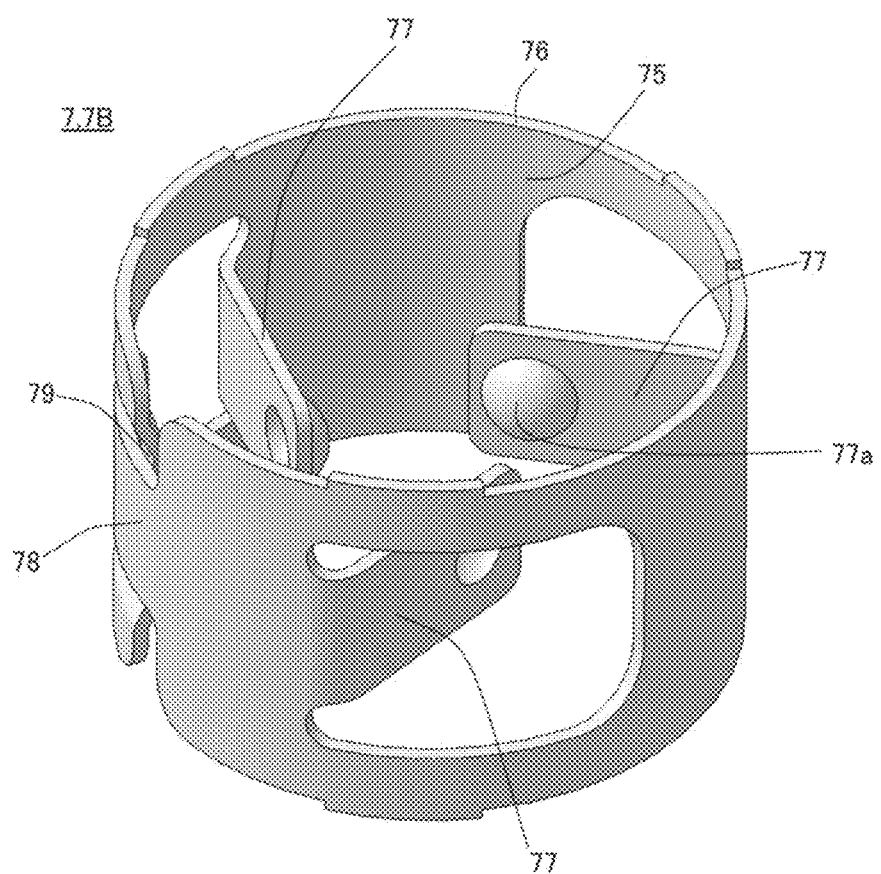
FIG. 2 is a schematic perspective view schematically showing an example of a vibration proof spring.
Figure 3:
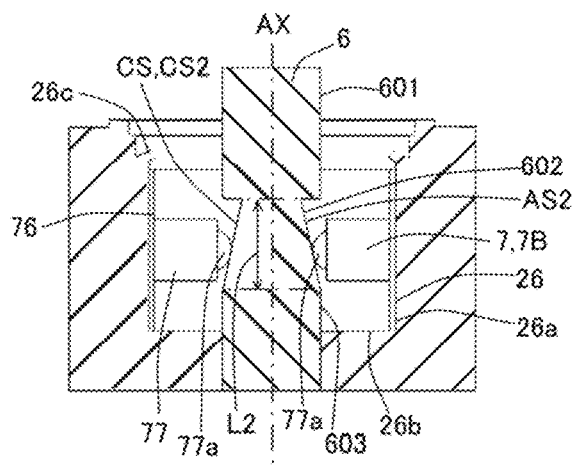
FIG. 3 is a view schematically showing a state of the vibration proof spring in a case where an opening degree of the expansion valve is very small.
Figure 4:
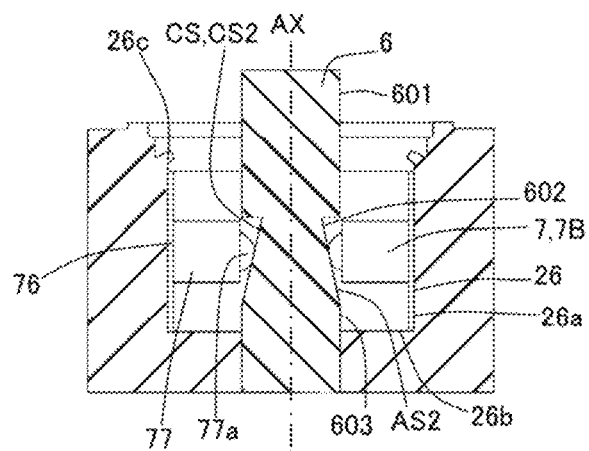
FIG. 4 is a view schematically showing a state of the vibration proof spring in a case where the opening degree of the expansion valve is comparatively large.

A description will be given of an expansion valve 1 according to an embodiment with reference to FIGS. 1 to 4. FIG. 1 is a view schematically showing an overall structure of the expansion valve 1 according to the embodiment. FIG. 2 is a schematic perspective view schematically showing an example of a vibration proof spring 7. FIG. 3 is a view schematically showing a state of the vibration proof spring 7 in a case where an opening degree of the expansion valve 1 is very small. FIG. 4 is a view schematically showing a state of the vibration proof spring 7 in a case where the opening degree of the expansion valve 1 is comparatively large.

The expansion valve 1 is provided with a valve main body 2 which includes a valve chamber VS, a valve body 3, a valve body support member 4, an urging member 5, an actuating bar 6, a vibration proof spring 7, and a contact surface CS with which the vibration proof spring 7 slidably contacts.

The valve main body 2 is provided with a first flow path 21 and a second flow path 22 in addition to the valve chamber VS. The first flow path 21 is, for example, a supply side flow path, and a fluid is supplied to the valve chamber VS via the supply side flow path. The second flow path 22 is, for example, a discharge side flow path, and the fluid within the valve chamber VS is discharged from the expansion valve via the discharge side flow path.

The valve body 3 is arranged within the valve chamber VS. In a case where the valve body 3 is seated on a valve seat 20 of the valve main body 2, the first flow path 21 and the second flow path 22 are in a non-communicating state. On the other hand, in a case where the valve body 3 is separated from the valve seat 20, the first flow path 21 and the second flow path 22 are in a communicating state.

The valve body support member 4 supports the valve body 3. In an example shown in FIG. 1, the valve body support member 4 supports the valve body 3 from the lower side.

The urging member 5 urges the valve body 3 toward the valve seat 20. The urging member 5 is, for example, a coil spring. In the example shown in FIG. 1, the urging member 5 upwardly urges the valve body 3 via the valve body support member 4.

The lower end of the actuating bar 6 is in contact with the valve body 3. Further, the actuating bar 6 presses the valve body 3 in an opening direction of the valve (that is, a downward direction) against urging force generated by the urging member 5. In a case where the actuating bar 6 moves in the downward direction, the valve body 3 separates from the valve seat 20 and the expansion valve 1 enters an open state.

The vibration proof spring 7 is a vibration proof member which suppresses a vibration of the valve body 3 and the actuating bar 6 (particularly, the operation valve 6). In the example shown in FIG. 1, the vibration proof spring 7 is arranged within a concave portion 26 which is different from the valve chamber VS. Further, in the example shown in FIG. 1, the concave portion 26 is communicated with a return flow path 23 to be mentioned later, and the concave portion 26 is arranged below the return flow path 23.

The contact surface CS is a surface with which the vibration proof spring 7 slidably contacts. In other words, the contact surface CS can relatively move with respect to the vibration proof spring 7, and the contact surface CS is in contact with the vibration proof spring 7. In the example shown in FIG. 1, the contact surface CS is an outer peripheral surface CS2 of the actuating bar 6.

In the embodiment, the amount of deformation of the vibration proof spring 7 increases as the valve body 3 goes towards a closing direction of the valve (that is, an upward direction). In other words, in the embodiment, the amount of deformation of the vibration proof spring 7 when the opening degree of the expansion valve 1 is very small is greater than the amount of deformation of the vibration proof spring 7 when the opening degree of the expansion valve 1 is large. Further, since the amount of deformation of the vibration proof spring 7 when the opening degree of the expansion valve 1 is very small is large, the expansion valve 1 has high vibration proof performance in a case where the opening degree of the expansion valve 1 is very small. Further, since the amount of deformation of the vibration proof spring 7 when the opening degree of the expansion valve 1 is large is relatively small, the expansion valve 1 suppresses an increase in a sliding resistance between the vibration proof spring 7 and the contact surface CS.

As mentioned above, in the expansion valve 1 according to the embodiment, the vibration proof performance of the expansion valve 1 is improved while suppressing the increase in the sliding resistance between the vibration proof spring 7 and the contact surface CS. In other words, during steady operation (when the valve opening degree is relatively large), the increase in the sliding resistance is suppressed, which does not impair controllability of the expansion valve 1 as a consequence. On the other hand, when the opening degree is very small where an abnormal noise tends to be generated, the amount of deformation of the vibration proof spring 7 is increased, thereby more effectively suppressing the vibration of the valve body 3 and/or the actuating bar 6. As a result, the generation of the abnormal noise from the expansion valve 1 can be suppressed.

In the embodiment, the vibration proof spring 7 is arranged within the concave portion 26 which is different from the valve chamber VS, and the contact surface CS with which the vibration proof spring 7 slidably contacts is an outer wall surface CS2 of the actuating bar 6.

In the example shown in FIG. 1, the vibration proof spring 7 is arranged between an inner wall surface 26a of the concave portion 26 and the actuating bar 6.

Further, in the example shown in FIG. 1, the contact surface CS (the outer peripheral surface CS2) is a deformation amount adjustment surface AS2 on which a distance from a center axis AX of the actuating bar 6 becomes shorter as the surface AS2 goes towards a closing direction of the valve, that is, towards the upward direction. More specifically, the contact surface CS (the outer peripheral surface CS2) is a tapered surface on which a distance from the center axis AX of the actuating bar 6 becomes shorter as the surface CS goes towards the closing direction of the valve, that is, towards the upward direction.

(Vibration Proof Spring 7)

A description will be given of an example of the vibration proof spring 7 according to the embodiment with reference to FIG. 2. In the example shown in FIG. 2, the vibration proof spring 7 is a ring spring 7B which is provided with a plurality of elastic protruding portions 77. In the example shown in FIG. 2, while the number of the elastic protruding portions 77 is three, instead thereof, the number of the elastic protruding portions 77 is preferably equal to or more than four.

The ring spring 7B shown in FIG. 2 is provided with a ring portion 76, and three or more elastic protruding portions 77 which inwardly protrude from the ring portion 76 and come into contact with the outer peripheral surface CS2 of the actuating bar 6.

In the example shown in FIG. 2, the elastic protruding portions 77 are arranged at even intervals along a circumferential direction of the ring portion 76. In the example shown in FIG. 2, each of the elastic protruding portions 77 is provided at its end with an end side protruding portion 77a which inwardly protrudes (in other words, toward the actuating bar 6). Further, as shown in FIG. 3, the end side protruding portion 77a comes into contact with the above deformation amount adjustment surface AS2. Additionally, the end side protruding portion 77a preferably has a partly spherical shell shape. The partly spherical shell shape means a shape which coincides or substantially coincides with a part of the spherical shell. In a case where the end side protruding portion 77a has the partly spherical shell shape, a portion coming into contact with the deformation amount adjustment surface AS2 forms a smooth curved surface portion. As a result, the deformation amount adjustment surface AS2 is resistant to scratch. Further, since the partly spherical shell shape is a structurally high-strength shape, the shape of the end side protruding portion 77a is less likely to be deformed for a long time.

In a case where the ring spring 7B is made of metal, the end side protruding portion 77a can be formed by plastically deforming a plate 75 which is a material for the ring spring 7B by press working. In other words, the end side protruding portion 77a is preferably a plastic deformation portion.

In the example shown in FIG. 2, the ring portion 76 is formed by bending the plate 75 into an annular shape. More specifically, the ring portion 76 is formed by overlapping an end tongue piece 78 which is provided in one end of the plate 75, and a tongue piece receiving portion 79 which is provided in the other end of the plate 75. However, a method for forming the ring portion 76 is not necessarily limited to the above example.

Referring to FIGS. 3 and 4, the actuating bar 6 can move in upward and downward directions while keeping in contact with the elastic protruding portion 77 of the ring spring 7B. In the example shown in FIG. 3, the outer peripheral surface CS2 of the actuating bar 6 is provided with a first surface 601 which coincides with or substantially coincides with a side surface shape of a virtual cylinder, a third surface 603 which coincides with or substantially coincides with a side surface of a virtual cylinder, and a second surface 602 which is arranged between the first surface 601 and the third surface 603. The second surface 602 is a surface which coincides with or substantially coincides with a side shape of a virtual truncated cone, and the second surface 602 corresponds to the deformation amount adjustment surface AS2.

A specific shape of the outer peripheral surface CS2 is optional without necessarily being limited to the example shown in FIGS. 3 and 4. For example, in the example shown in FIGS. 3 and 4, while an intersection between the second surface 602 and the plane passing through the center axis AX of the actuating bar 6 is a straight line, instead thereof, the intersection is preferably a curved line.

In a case where the vibration proof spring 7 is the ring spring 7B, the deformation amount adjustment surface AS2 of the actuating bar 6 moves while keeping in contact with the elastic protruding portion 77 of the ring spring 7B. More specifically, the deformation amount adjustment surface AS2 of the actuating bar 6 slides with respect to the end side protruding portion 77a of the elastic protruding portion 77.

In the example shown in FIGS. 3 and 4, the a lower end of the ring spring 7B is in contact with a bottom surface 26b of the concave portion 26, and the upper end of the ring spring 7B is caulked and fixed by a caulking portion 26c of the concave portion 26.

In the example shown in FIGS. 3 and 4, the deformation amount adjustment surface AS2 is a surface in which a distance from the center axis AX of the actuating bar 6 becomes shorter as the surface AS2 goes towards an upward direction. As a result, the elastic protruding portion 77 outwardly deforms greatly (in other words, in a moving direction in which the elastic protruding portion 77 goes away from the center axis AX of the actuating bar 6) in a state where the valve opening degree is very small (a state shown in FIG. 3). Further, since the amount of elastic deformation of the elastic protruding portion 77 is large, the actuating bar 6 is aligned by relatively strong force. In addition, since the lower end of the actuating bar 6 is in contact with the valve body 3, the valve body 3 is also center aligned by the relatively strong force. Therefore, in a state where the valve opening degree is very small (the state shown in FIG. 3), the valve body 3 is aligned by the relatively strong force. Due to this, the valve body 3 is resistant to lateral vibration, and is less likely to generate an abnormal noise.

On the other hand, in a state where the valve opening degree is comparatively large (the state shown in FIG. 4), the amount of elastic deformation of the elastic deforming portion 77 is relatively small. As a result, a sliding resistance between the ring spring 7B and the outer peripheral surface CS2 of the actuating bar 6 is small. Therefore, in a state where the valve opening degree is comparatively large (that is, in a steady operation state), the opening degree of the expansion valve 1 is smoothly adjusted by the actuating bar 6.

It is preferable that a length L2 of the second surface 602 in a direction along a longitudinal direction of the actuating bar 6 is larger than a distance between a lower moving limit of the valve body 3 and an upper moving limit of the valve body 3.

(Application Example of Expansion Valve 1)

Figure 5:
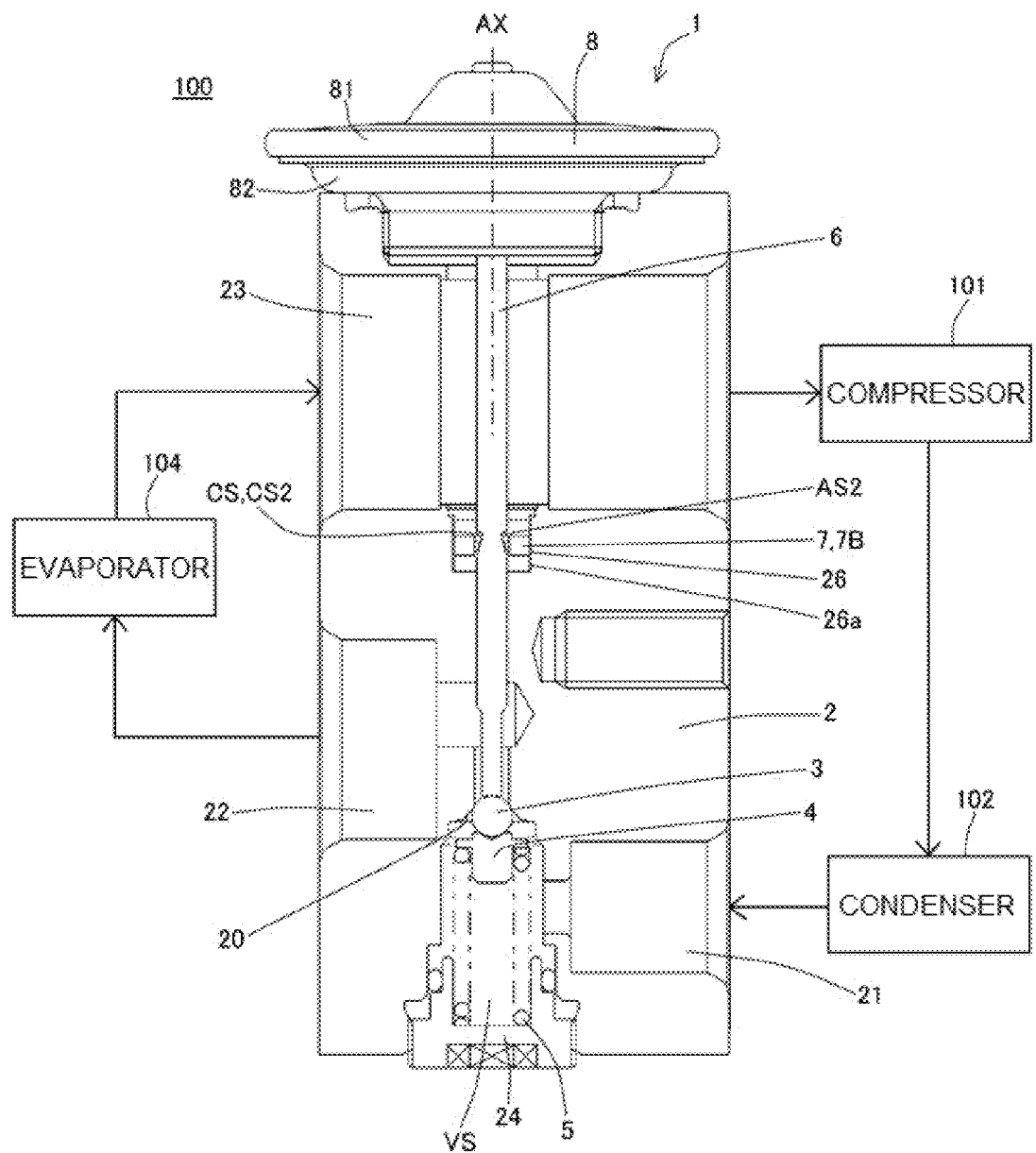
FIG. 5 is a schematic cross sectional view schematically showing an example in which the expansion valve according to the embodiment is applied to a refrigerant circulation system.

A description will be given of an example to which the expansion valve 1 is applied with reference to FIG. 5. FIG. 5 is a schematic cross sectional view schematically showing an example in which the expansion valve 1 according to the embodiment is applied to a refrigerant circulation system 100.

In the example shown in FIG. 5, the expansion valve 1 is fluid connected to a compressor 101, a condenser 102 and an evaporator 104.

Further, the expansion valve 1 is provided with a power element 8 which drives the actuating bar, and a return flow path 23, in addition to the valve main body 2, the valve body 3, the valve body support member 4, the urging member 5, the actuating bar 6, the vibration proof spring 7, the first flow path 21, and the second flow path 22.

Referring to FIG. 5, a refrigerant compressed by the compressor 101 is liquefied by the condenser 102, and is fed to the expansion valve 1. Further, the refrigerant adiabatically expanded by the expansion valve 1 is fed out to the evaporator 104, and is heat exchanged by the evaporator 104 with air flowing around the evaporator. The refrigerant going back from the evaporator 104 is returned back to the compressor 101 side through the expansion valve 1 (more specifically, through the return flow path 23).

A high-pressure refrigerant is supplied to the expansion valve 1 from the condenser 102. More specifically, the high-pressure refrigerant from the condenser 102 is supplied to the valve chamber VS via the first flow path 21. The valve body 3 is arranged within the valve chamber VS opposed to the valve seat 20. Further, the valve body 3 is supported by the valve body support member 4, and the valve body support member 4 is upwardly urged by the urging member (for example, the coil spring). In other words, the valve body 3 is urged in a valve closing direction by the urging member 5. The urging member 5 is arranged between the valve body support member 4 and the urging member receiving member 24. In the example shown in FIG. 5, the urging member receiving member 24 is a plug which seals the valve chamber VS by being installed in the valve main body 2.

In a case where the valve body 3 is seated on the valve seat 20 (in other words, in a case where the expansion valve 1 is in a closed state), the first flow path 21 on the upstream side of the valve chamber VS and the second flow path 22 on the downstream side of the valve chamber VS are in a non-communication state. On the other hand, in a case where the valve body 3 is separated from the valve seat 20 (in other words, in a case where the expansion valve 1 is in an open state), the refrigerant supplied to the valve chamber VS is discharged into the evaporator 104 through the second flow path 22. Switching between a closed state and an open state of the expansion valve 1 are made by the actuating bar 6 connected to the power element 8.

In the example shown in FIG. 5, the power element 8 is arranged in an upper end portion of the expansion valve 1. The power element 8 is provided with an upper lid member 81, a receiving member 82 which has at its center an opening, and a diaphragm which is arranged between the upper lid member 81 and the receiving member 82. A first space which is surrounded by the upper lid member 81 and the diaphragm is filled with a working gas.

A lower surface of the diaphragm is connected to the actuating bar 6 via the diaphragm support member. As a result, when the working gas within the first space is liquefied, the actuating bar 6 moves in an upward direction, and when the liquefied working gas is vaporized, the actuating bar 6 moves in a downward direction. In this way, the expansion valve 1 is switched between the open state and the closed state.

A second space between the diaphragm and the receiving member 82 is communicated with the return flow path 23. Therefore, a phase (a gas phase or a liquid phase) of the working gas within the first space is changed in response to a temperature and a pressure of the refrigerant flowing through the return flow 23, thereby driving the actuating bar 6. In other words, in the expansion valve 1 shown in FIG. 5, the amount of the refrigerant supplied from the expansion valve 1 toward the evaporator 104 is automatically adjusted in response to the temperature and the pressure of the refrigerant returning back to the expansion valve 1 from the evaporator 104. In the example shown in FIG. 5, the return flow path 23 is communicated with the concave portion 26 in which the vibration proof spring 7 is arranged.

The present invention is not necessarily limited to the above embodiments. A modification is possible to any constituent elements in each of the above embodiments, within the scope of the present invention. Further, addition or omission is possible to any constituent elements in each of the above embodiments.

For example, in the above embodiments, the description is given of the example in which the vibration proof spring 7 is made of the metal. Alternatively, the vibration proof spring 7 is preferably made of a resin.

REFERENCE SIGNS LIST

1: expansion valve
2: valve main body
3: valve body
4: valve body support member
5: urging member
6: actuating bar
7: vibration proof spring
7B: ring spring
8: power element
20: valve seat
21: first flow path
22: second flow path
23: return flow path
24: urging member receiving member
26: concave portion
26a: inner wall surface
26b: bottom surface
26c: caulking portion
75: plate
76: ring portion
77: elastic protruding portion
77a: end side protruding portion
78: end portion tongue piece
79: tongue piece receiving portion
81: upper lid member
82: receiving member
100: refrigerant circulation system
101: compressor
102: condenser
104: evaporator
601: first surface
602: second surface
603: third surface
AS2: deformation amount adjustment surface
CS: contact surface
CS2: outer peripheral surface
VS: valve chamber

The invention claimed is:

1. An expansion valve comprising:
a valve main body provided with a valve chamber therein;
a valve body arranged within the valve chamber;
an urging member urging the valve body toward a valve seat;
a valve body support member disposed between the urging member and the valve body;
an actuating bar being in contact with the valve body and pressing the valve body in an opening direction of the valve against an urging force generated by the urging member; and
a vibration proof spring suppressing a vibration of the valve body and/or the actuating bar, wherein the actuating bar has an outer peripheral surface of which a part defines a contact surface slidably contacting with the vibration proof spring, wherein the actuating bar has a stepped surface at an upper end of the contact surface, the stepped surface being provided perpendicularly to a center axis of the actuating bar and facing a side of the vibration proof spring, and the contact surface is defined by a tapered surface of the actuating bar that extends from the stepped surface in the opening direction such that a width of the actuating bar is decreased at the stepped surface and increases along the tapered surface in the opening direction;

wherein a length of the tapered surface in a direction along a longitudinal direction of the actuating bar is larger than a distance between a lower moving limit of the valve body and an upper moving limit of the valve body, and the stepped surface defines the lower moving limit of the valve body by coming into contact with an upper portion of the vibration proof spring;

wherein the amount of deformation of the vibration proof spring becomes greater as the valve body goes towards a closing direction of the valve.

2. The expansion valve according to claim 1, wherein the vibration proof spring comprises a ring spring, and wherein the ring spring comprises:

a ring portion; and an elastic protruding portion inwardly protruding from the ring portion and contacting with the outer peripheral surface of the actuating bar.

3. The expansion valve according to claim 1, wherein the valve main body comprises a first flow path and a second flow path communicating with the valve chamber, and a return flow path;

wherein the vibration proof spring is arranged within a concave portion of the valve main body, and wherein the concave portion communicates with the return flow path.

4. The expansion valve according to claim 1, further comprising a power element driving the actuating bar.

* * * * *